(12) United States Patent
Wang et al.

(10) Patent No.: US 8,103,376 B2
(45) Date of Patent: Jan. 24, 2012

(54) SYSTEM AND METHOD FOR THE ON-MACHINE 2-D CONTOUR MEASUREMENT

(75) Inventors: Shih-Ming Wang, Tao-Yuan (TW); Han-Jen Yu, Tao-Yuan (TW)

(73) Assignee: Chung Yuan Christian University, Tao-Yuan (TW)

( * ) Notice: Subject to any disclaimer, the term of this patent is extended or adjusted under 35 U.S.C. 154(b) by 676 days.

(21) Appl. No.: 12/205,011

(22) Filed: Sep. 5, 2008

(65) Prior Publication Data

US 2010/0063612 A1    Mar. 11, 2010

(51) Int. Cl.
*G06F 19/00* (2011.01)
(52) U.S. Cl. ....... 700/195; 700/175; 700/187; 700/194; 382/141; 382/152

(58) Field of Classification Search ................. 700/110, 700/174, 175, 177, 187, 189, 194, 195; 382/141, 382/152
See application file for complete search history.

(56) References Cited

U.S. PATENT DOCUMENTS

| 4,630,309 | A | * | 12/1986 | Karow | 382/241 |
| 5,189,625 | A | * | 2/1993 | Le Floch | 382/152 |
| 6,323,776 | B1 | * | 11/2001 | Jackson et al. | 340/679 |

* cited by examiner

*Primary Examiner* — Albert Decady
*Assistant Examiner* — Steven Garland
(74) *Attorney, Agent, or Firm* — WPAT, PC; Justin King

(57) ABSTRACT

The present invention provides a system and method for the on-machine 2-D contour measurement, employing the contour measurement, coordinate system transformation, error identification, and image matching theory in image processing field to develop the on-machine measurement of X-Y-plan manufacturing error of a micro device manufactured by a high-precision micro-device machine tool, contour error, and trace error.

18 Claims, 13 Drawing Sheets

(a) The bird's eye view of the Pentagon (b) Sobel contour measurement (c) Laplace of Gaussian contour measurement (d) Canny contour measurement

SYSTEM AND METHOD FOR THE ON-MACHINE 2-D CONTOUR MEASUREMENT

BACKGROUND OF THE INVENTION

1. Field of the Invention

The present invention provides a system and method for the on-machine 2-D contour measurement, employing the contour measurement, coordinate system transformation, error identification, and image matching theory in image processing field to develop the on-machine measurement of X-Y-plan manufacturing error of a micro device manufactured by a high-precision micro-device machine tool, contour error, and trace error.

2. Description of the Prior Art

Multi-axis machine tools have been the mainstream for manufacturing equipments. The domestic machine tools keep upgrading continuously towards the development of microstructure, high-precision, and high-speed. The relevant fields of research and development include high-precision micro-device machine tools, high-speed-and-linear-motor-operated machine tools, parallel-structure machine tools, multi-function five-axis manufacturing tools, high-precision high-speed main shafts, micro-manufacturing technology, high-speed cutting technology, dry-cutting technology, high-precision measurement technology, error-compensation technology, temperature-increasing-caused heat deformation compensation technology, high-speed supply control technology, structure analysis technology, and so on. They respond to the demands of the micro-manufacturing of the high technology products, such as high-precision molding tools, semiconductor manufacturing equipment components, aviation components, photoelectric product. Therefore, the target of the functions of the oncoming machine tools has to be developed toward sub-micro and high-precision manufacturing.

On-machine measurement equipment and method are one of the important key technologies. It is suitable for precision measurement equipments adapted for high-precision micro-manufacturing devices. These high level equipments include scanning electron microscope, electron analyzer, focusing ion beam, and so on. The middle and low level equipments include closed circuit television, far-focus optical system, and so on. There is a common point for those equipments mentioned above. They all employ the non-touch measurement methods. However, nowadays the relevant technologies and documents all employ off-line measurement method. Therefore, the relevant researches suitable for non-touch and on-machine measurement for high-precision micro machine tools, and for the on-machine error correction are necessary to develop.

SUMMARY OF THE INVENTION

Therefore, in accordance with the previous summary, objects, features and advantages of the present disclosure will become apparent to one skilled in the art from the subsequent description and the appended claims taken in conjunction with the accompanying drawings.

An embodiment of the present invention is a 2-D contour measurement method, as shown in FIG. 12. First, as shown at step 1210, a cutting tool of a computer numerical control (CNC) machine cuts an object according to a numerical control code. The next is illustrated as step 1220 and step 1230, a graphics retrieving apparatus is employed to retrieve an image of an object, and a contour detecting method is employed to generate an object contour in the image according to the image. Besides, as shown at step 1240, a theoretical contour is generated according to the numerical control code. Next, as shown at step 1250, the object contour and the theoretical contour are overlapped in the same coordinate system. And then as shown at steps 1260 and 1270, a plurality of theoretical cutting points of the theoretical contour in the coordinate system is defined, and also a plurality of the real cutting points of the object in the coordinate system is defined. Next, as shown at step 1280, the matched real cutting point of each of the theoretical cutting points is found according to each of the theoretical points. At last, as shown at step 1290, a manufacturing error responding to each of the theoretical cutting points is found out respectively according to each of the theoretical cutting points and each of the real cutting points.

Another embodiment of the present invention is a 2-D contour measurement system, including an object, a computer numerical control (CNC) machine tool storing a numerical control code, and an error identifying apparatus. The CNC machine tool cuts the object by a cutting tool according to the numerical control code. Besides, the error identifying apparatus may be a computer storing programming code, so that the computer can be programmed to work as the following apparatus, which includes an apparatus employing a graphics retrieving apparatus to retrieve an image of the object, an apparatus employing a contour detecting method to generate a contour of the image according to the image, an apparatus generating a theoretical contour according to the numerical control code, an apparatus overlapping the object contour with the theoretical contour in a coordinate system, an apparatus defining a plurality of theoretical cutting points of the theoretical contour in the coordinate system, an apparatus defining a plurality of real cutting points of the object contour in the coordinate system, an apparatus determining a matched real cutting point of each of the real cutting points respectively according to each of the real cutting points, an apparatus identifying a manufactured error corresponding to each of the theoretical cutting points respectively according to each of the theoretical cutting points and the matched real cutting point.

BRIEF DESCRIPTION OF THE DRAWINGS

The accompanying drawings incorporated in and forming a part of the specification illustrate several aspects of the present invention, and together with the description serve to explain the principles of the disclosure. In the drawings.

DETAILED DESCRIPTION OF THE PREFERRED EMBODIMENTS

Figure 1:
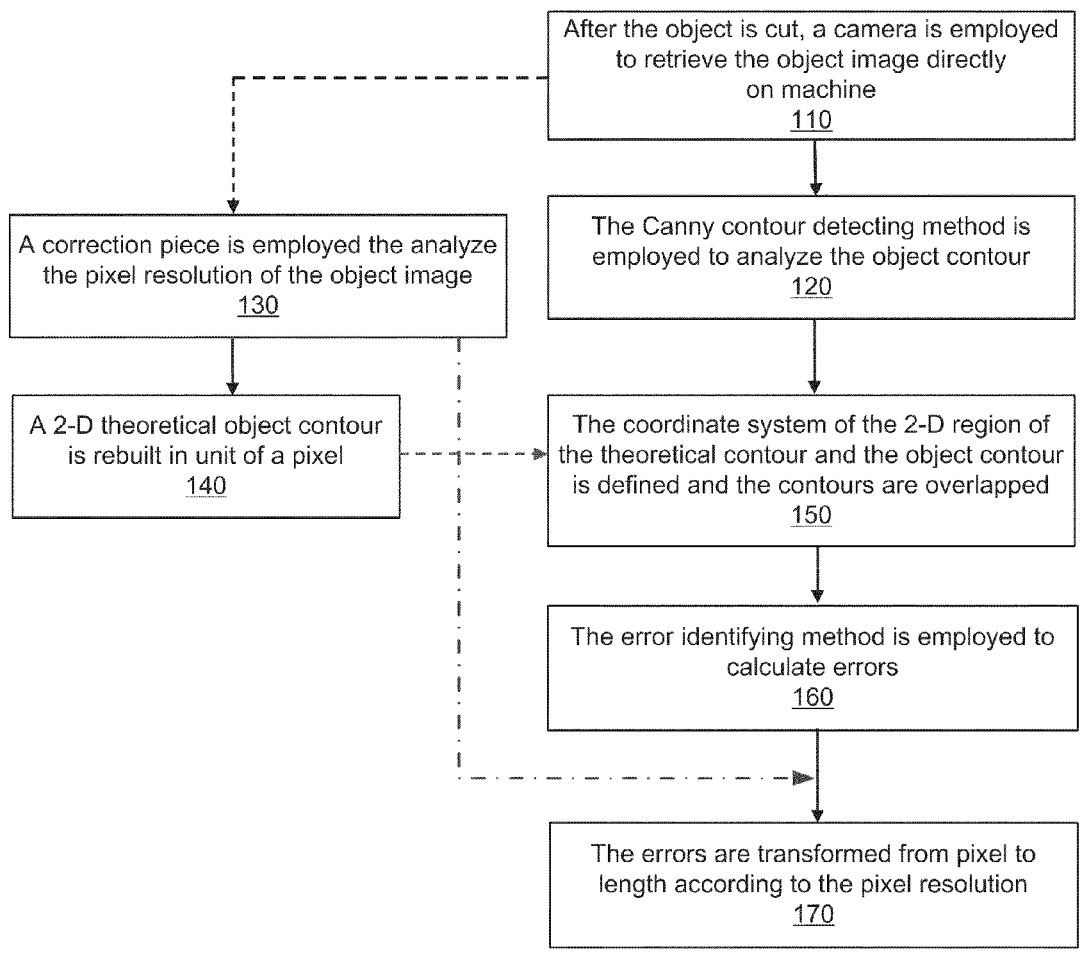
FIG. 1 is a diagram of the method for the on-machine 2-D contour measurement.

The present disclosure can be described by the embodiments given below. It is understood, however, that the embodiments below are not necessarily limitations to the present disclosure, but are used for teaching the invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary the intent is to cover all alternatives, modifications and equivalents included within the spirit and scope of the invention as defined by the appended claims.

It is noted that the drawings presents herein have been provided to illustrate certain features and aspects of embodiments of the invention. It will be appreciated from the description provided herein that a variety of alternative embodiments and implementations may be realized, consistent with the scope and spirit of the present invention.

It is also noted that the drawings presents herein are not consistent with the same scale. Some scales of some components are not proportional to the scales of other components in order to provide comprehensive descriptions and emphasizes to this present invention.

The present invention provides a 2-D contour detecting method, as shown in FIG. 1. At first, as shown at step 110, after the object is cut, a camera is employed to retrieve the object image directly on machine. Next, as shown at step 120, the contour detecting method is employed to analyze the object contour. In an embodiment of the present invention, the contour detecting method is employed in Canny contour detecting method. At the same time, as shown at step 130 and 140, a correction piece is employed to analyze the pixel resolution of the object image, and a 2-D theoretical object contour is rebuilt in unit of a pixel. And then, as shown at step 150, the coordinate system of the 2-D region of the theoretical contour and the object contour is defined and transformed (i.e. the coordinate system of the 2-D region of the theoretical contour and the object contour is defined and the contours are overlapped). Next, as shown at step 160, the error identifying method is employed to calculate errors. In one embodiment of the present invention, the error is calculated in unit of a pixel. At last, as shown at step 170, the errors are transformed from pixel to length according to the pixel resolution.

Figure 2A:
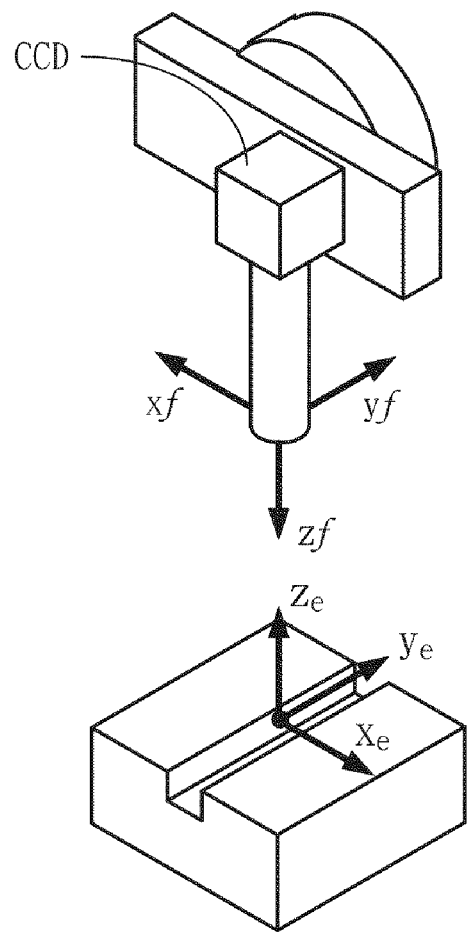
FIGS. 2A and 2B are diagrams a diagram of the orientation of the camera and object for the method for the on-machine 2-D contour measurement.
Figure 2B:
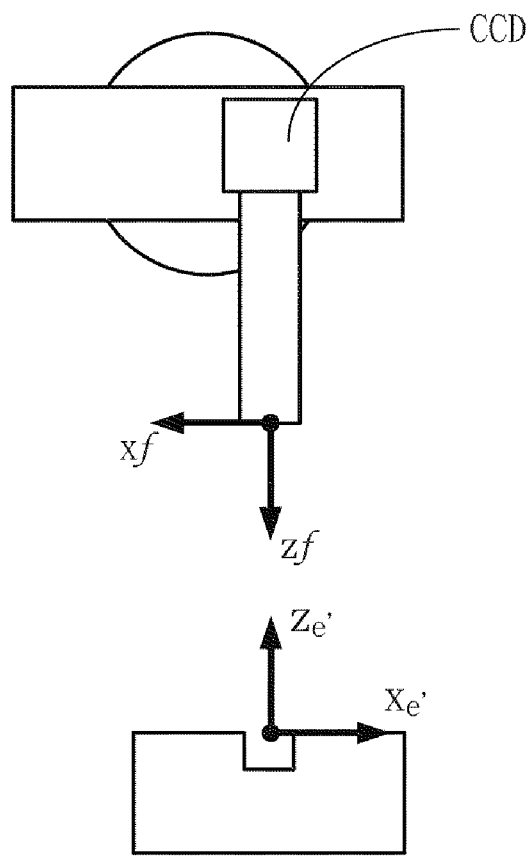

After the object is micro-manufactured by the machine tool, a camera is employed to retrieve the object image on machine. The relative orientation of the camera and the object is shown in FIG. 2. An image retrieving apparatus CCD is employed to retrieve an image for an object O. According to the figure, when taking the picture, the z axises of the camera's coordinate system $[x_f, y_f, z_f, 1]^T$ and the object's coordinate system $[x_e, y_e, z_e, 1]^T$ are parallel.

When the image is retrieved, the contour detecting method is employed to analyze the actual object contour in the image. In one embodiment of the present invention, the Canny contour detecting method is employed to analyze the actual object contour, which is the manufactured real object contour. When analyzing the actual object contour, the correction piece is employed to analyze the resolution of the image and the proper cutting path of the cutting tool and the proper s size of the cutting tool are adapted to build the 2-D theoretical object in unit of a pixel. When the actual object contour and the theoretical object contour are defined, the two contours can be located in the same coordinate system by directly comparing the differences between the two contours so as to obtain the manufacturing errors. In one embodiment of the present invention, two reference points are defined respectively on the actual object contour and the theoretical object contour. The coordinate systems for the actual and theoretical object contour regions is defined according to the relative relation of the two reference points, and the coordinate system transforming is performed to locate the two contours in the same coordinate system (theoretical object contour region coordinate system). After the two contours are located in the same coordinate system by coordinate system transforming, the manufacturing errors of the object in the image are obtained by employing the error identifying method developed based on the image matching method. At last, the errors are transformed from the pixel unit value to the length unit value according to the image resolution. The errors after the unit transforming are the contour errors and trace errors of the micro-object in the object space.

The on-machine 2-D contour measurement method mainly includes 4 items: (1) contour detecting, (2) theoretical object contour rebuilding in unit of a pixel, (3) defining the partial coordinate systems of the actual and theoretical object contours and transforming the coordinate systems of the tow contours, and (4) error identifying.

Contour Identifying

The contour refers to the partial region of the gray levels, which changes most obviously between levels, in the image. The contour exists between the target and target, target and background, region and region (including different colors). The contour is the important basis for image analysis, such as image division, texture character, and shape character. The contour measurement is to perform the partial differentiation on the adjacent gray levels to calculate the gradient of the pixels, and also the threshold value of the gradient is set to identify whether the pixels are on the contour or not. The contour measurement can analyze the size and orientation of the object. Besides, it can retrieve the specific object from the image, and also identify and classify the object. The contour measurement includes the following 4 steps:

(1) image filtering: The current image retrieving method employs digital devices, such as CCD and CMOS. Except the target object itself, the noise is generated in the image because the affection of the current inside the digital optic sensing device, the length of the exposure time, the setting of the sensitization value, and the radius of the diaphragm. Employing the filter to filter image is the most frequently used method to reduce the gray level value of the noise point.

(2) contour enhancing: One-level or two-level partial differentiation is employed to calculate the gradient. The gradient refers to the gray level variation of the adjacent pixels. It is called contour enhancing.

(3) contour analyzing: After contour enhancing, the image is indicated by gradient. To identify which pixels are on the contour, the gradient adopting contour analyzing is used to identify which pixels are on the contour. The simplest contour analyzing method is the Threshold identifying method, i.e. the gradient threshold value. When the gradient of the pixel is over the threshold value, it is on the contour, otherwise, it is not.

(4) contour positioning: if the pixel is identified to be on the contour, the 2-D image is employed to indicate the coordinate in the pixel coordinate system.

Figure 3:
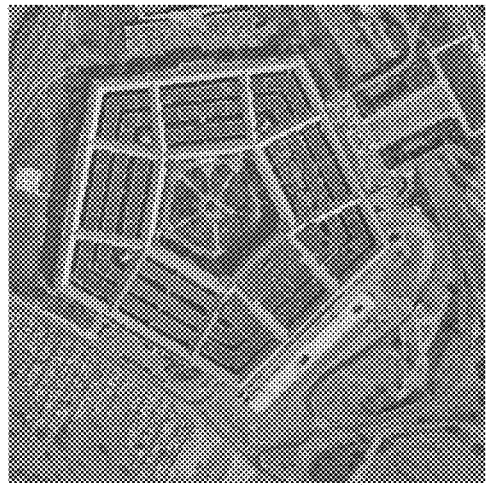
FIGS. 3A, B, C, and D are the comparison of the examples for the method of the contour measurement.
Figure 3:
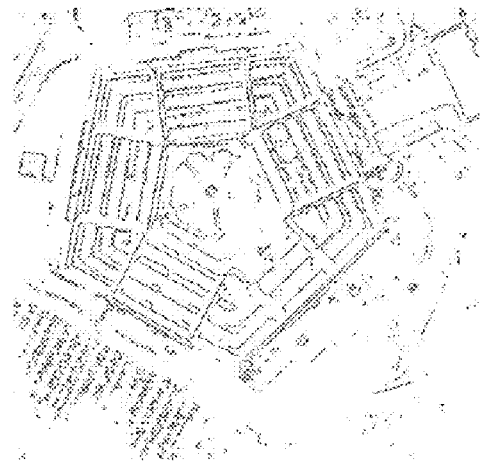
Figure 3:
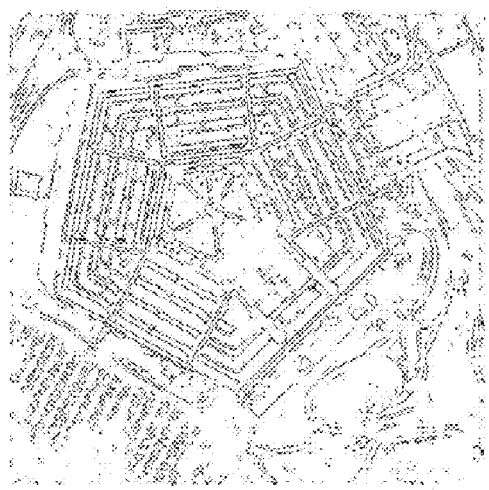
Figure 3:
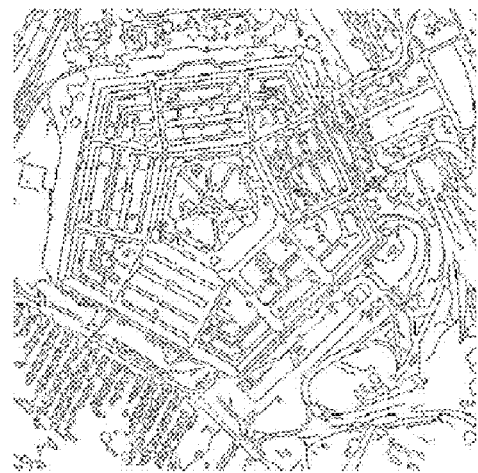

Sobel, Laplace of Gaussian, and Canny are three of the most frequent contour measurement methods. Sobel and Laplace of Gaussian contour measurement methods employ the partial differentiation filter to calculate the gradients of the pixels. They also identify if the pixels are on the contour according the gradient threshold value. Although their steps are very simple and fast, identification which is done only by the gradient can cause the contour-measured image comprises multiple, incorrect, and un-continuous contour. It is also not helpful in indicating the object contour. Canny contour measurement combines the advantages of the filtering function of the Gaussian filter and the orientation function of the Sobel partial differentiation filter. Canny provides that it can indicate one single and the best contour, and connect the un-continuous contours by adopting the double threshold value identifying method. FIG. 3A is the bird's eye view of the Pentagon, and FIGS. 3B, C and D are the images after worked by the Sobel, Laplace of Gaussian, and Canny contour measurement methods. Compared by FIGS. 3A, B, C, and D, It is obvious that the Canny measurement method can determine out the continuous contour in some better degree, and indicate the contour by connecting every single pixel. In one embodiment of the present invention, the Canny measurement method is employed to detect the object's contour to obtain the continuous and the best actual object contour.

Rebuilding the Theoretical Object Contour in Pixel Unit

Figure 4:
FIG. 4 is the diagram of the correction piece.
Figure 6:
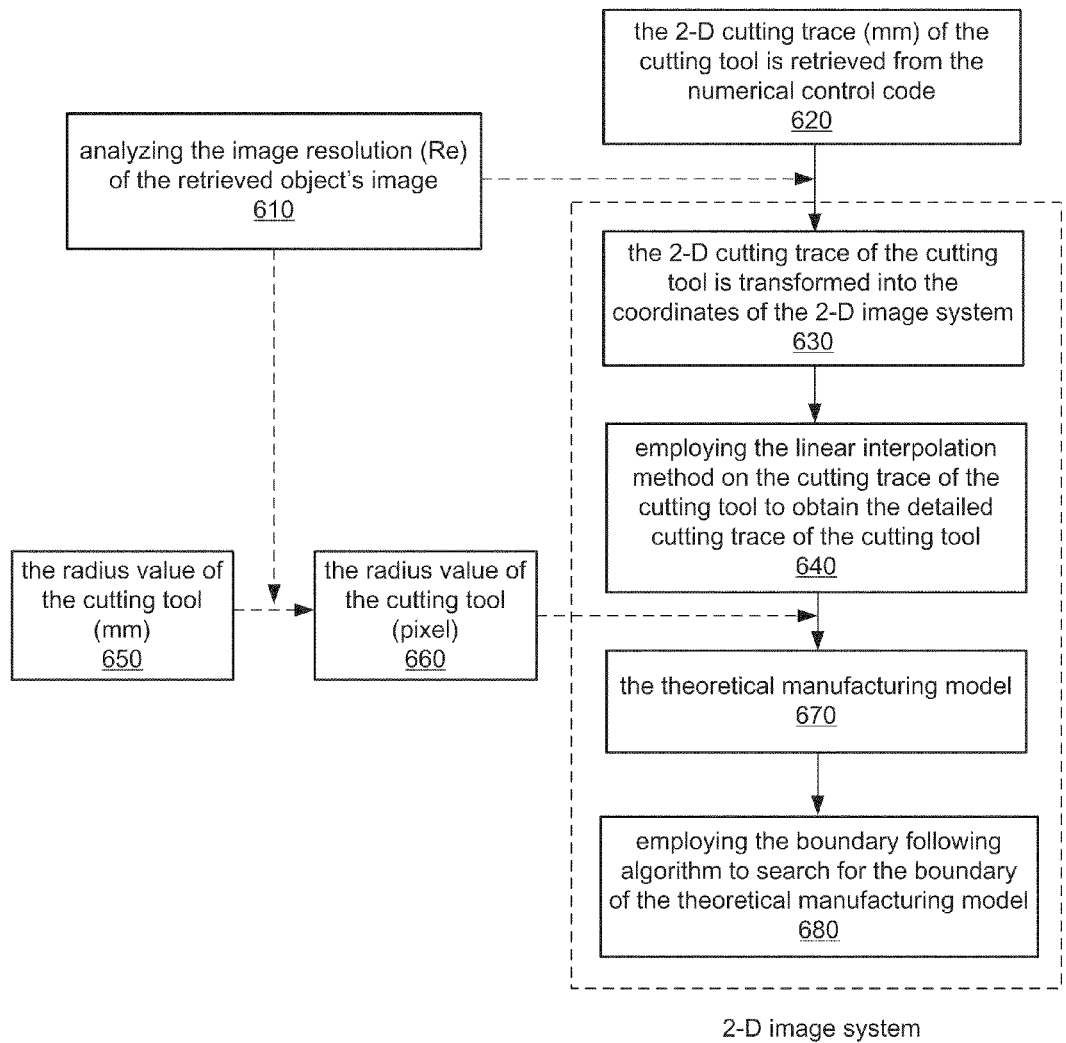
FIG. 6 is the diagram for rebuilding flowchart of the theoretical object contour.

The manufacturing errors can be obtained by comparing the theoretical object contour model and the actual object contour practically retrieved in the image retrieving method. But the object contour model built by the CAD software cannot be the basis for directly performing error analyzing, because the unit, adopted by the image method, of the actual object contour is different from the unit defined in the CAD software. Therefore, the first work is to rebuild the theoretical object model in unit of a pixel so as to analyze the manufacturing errors. In an embodiment of the present invention, the X-Y plane cutting trace analysis of the cutting tool in the numerical control code is employed, adopting the size of the cutting tool and the resolution of the image, to rebuild the theoretical object contour in unit of a pixel. The rebuilding flowchart of the pixel-unit theoretical object contour is shown in FIG. 6, comprising steps as the following:

(1) analyzing the image resolution of the retrieved object's image (Re, the definition is size of the real object in a pixel unit in the image), as shown at step 610. The correction piece (as shown in FIG. 4) is employed to analyze the resolution of the image, adopting steps:
   (a) placing the correction piece on the surface of the object;
   (b) employing the camera to retrieve the image of the correction piece;
   (c) employing the contour measurement method to analyze the contour of the figure on the correction piece;
   (d) performing converting according to the real size (mm) of the given figure and the contour size (pixel) of the figure in the image to obtain the resolution of the image (mm/pixel).

(2) employing the unit converting method, on the cutting trace of the cutting tool in a plane, to transform unit in length into unit in a pixel according to the cutting trace of the cutting tool in the plane retrieve from the numerical control code and the obtained resolution of the image, and then indicating the coordinate system of the cutting trace of the cutting tool in the plane by 2-D image in the reference coordinate system, as shown at step 620.

(3) employing the linear interpolation method on the cutting trace of the cutting tool to obtain the detailed cutting trace of the cutting tool as shown at step 630 and 640. When performing the numerical control code conversion, the CAD software usually converts the two end points of a line for the linear cutting trace of the cutting tool, without converting the line of the trace. However, it is necessary to analyze the cut region by the cutting tool according to the detailed cutting trace of the cutting tool when the theoretical object contour is rebuilt so as to analyze the theoretical manufacturing model. In one embodiment of the present invention, the linear interpolation method is employed to obtain the coordinates of the pixels for each of the trace of the linear cutting traces. When the interpolation is employed to obtain the coordinates of the linear cutting trace of the cutting tool, i' is increased by a pixel to perform the calculation of the j' coordinate between $i_1$ and $i_2$. In other word, there are $(i_2-i_1-1)$ coordinates between $i_1$ and $i_2$. If j' is not an integer, it is calculated by round-off.

(4) employing the obtained resolution of the image to convert the radius value of the cutting tool by pixel unit, as shown at step 650 and 660.

(5) as shown at step 670, employing the detailed cutting trace of the cutting tool and the radius value of the cutting tool after the units are converted to rebuild the theoretical manufacturing model in the reference coordinated system. When the theoretical manufacturing model of plane is established, the detailed cutting trace of the cutting tool, adopting the radius of the cutting tool, is employed to analyze the cut coordinates on the cutting trace, and also the coordinates are indicated in the 2-D image. At last, the analyzed 2-D image is the theoretical manufacturing model.

(6) as shown at step 680, employing the boundary following algorithm to search for the boundary of the theoretical manufacturing model. The analyzed boundary is the theoretical object contour.

Figure 5A:
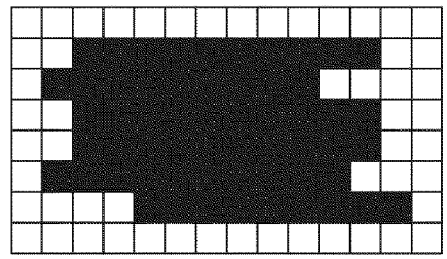
FIGS. 5A, and B are the diagrams for the contout following theory of the 2-D image.
Figure 5B:
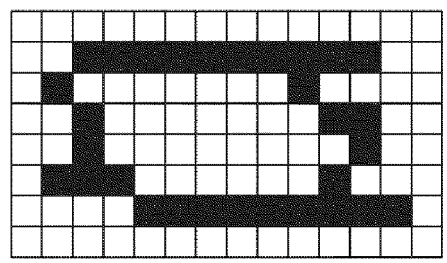

FIGS. 5A and B are the boundary following examples of the 2-D image. FIG. 5A is the original 2-D image, and FIG. 5B is the contour figure after the boundary following algorithm is performed.

Figure 7:
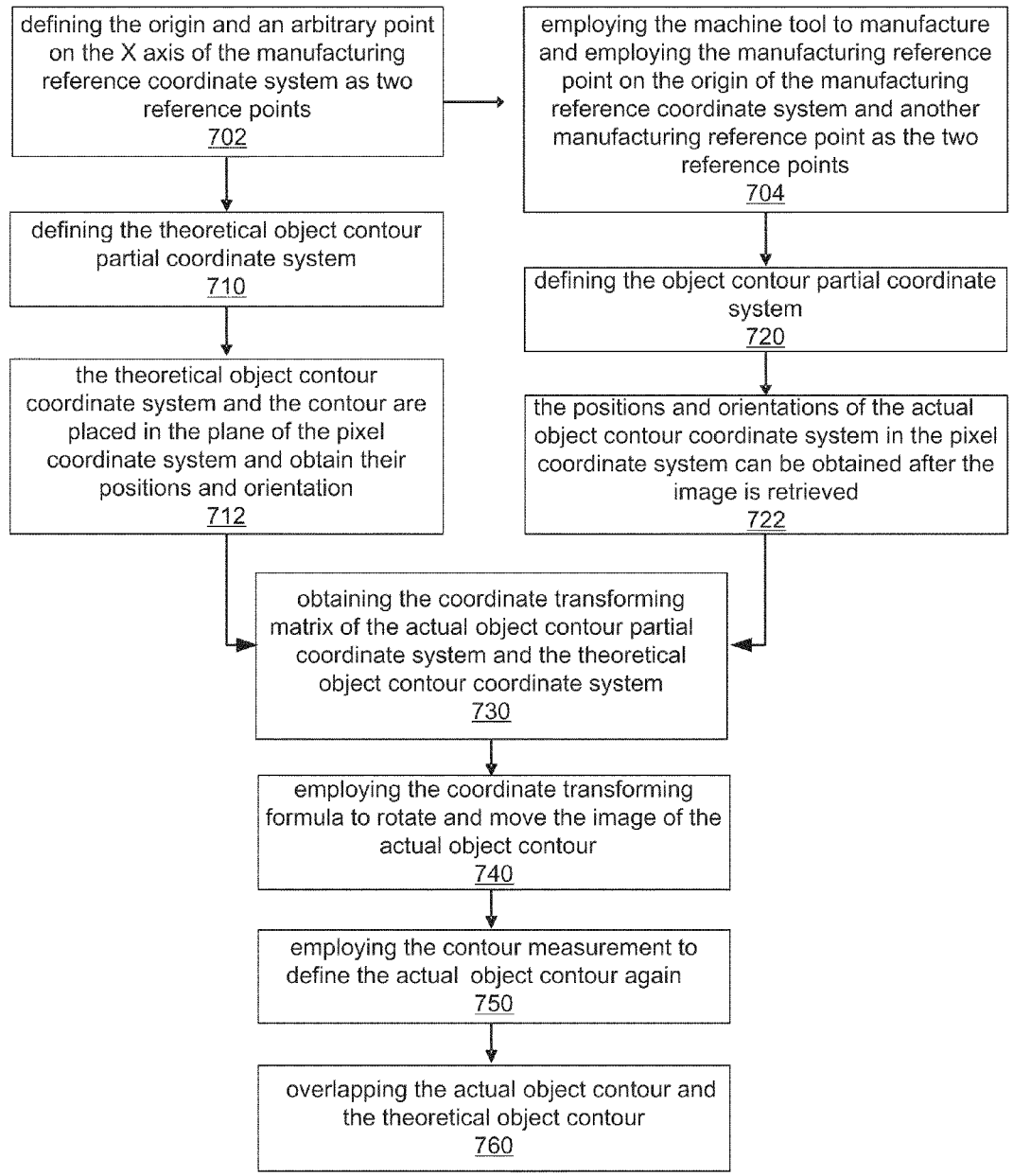
FIG. 7 is the overlapping flowchart of the actual object contour and theoretical object contour.

Defining the Coordinate Systems of the Actual Object Contour and the Theoretical Object Contour and Performing the Coordinate Transformation for the Two Contours After the actual object contour and the theoretical object contour are obtained, the coordinates of the actual object contour can be transformed into the coordinates of the theoretical object contour by coordinate transforming in theory to perform the error comparison. But the transforming parameters for the transformation of the reference coordinate system of the actual object contour and the pixel coordinate system of the theoretical object contour need a complex measurement method to obtain. Therefore, in one embodiment of the present invention, the coordinate systems of the actual object contour and the theoretical object contour are defined. And also the coordinate transforming matrix of the two partial coordinate systems is employed to overlap the actual object contour and the actual object contour to perform the error identification. FIG. 7 is the coordinate transforming flowchart for defining the coordinate systems of the actual object contour and the theoretical object contour and performing the coordinate transformation for the tow contours. The steps are as the following:

(1) as shown at step 702, defining the origin and an arbitrary point on the X axis of the manufacturing reference coordinate system as two reference points; and as shown at step 710, defining the theoretical object contour partial coordinate system $(i_c, j_c)$ and the object contour partial coordinate system $(i_{c'}, j_{c'})$ as the basis for coordinate transformation when the contours are overlapped. When the CAD model is established, the origin of the reference coordinate system and an arbitrary point of the object are selected as the basis to define the object-contour partial coordinate system. The two points are generated on the object as well when the object is manufactured. At that time, they can be employed to define the object-partial coordinate system for overlapping on the actual object. Next, as shown at step 712, the theoretical object contour coordinate system and the contour are placed in the plane of the pixel coordinate system and obtain their positions and orientation.

(2) as shown at step 704, employing the machine tool to manufacture and employing the manufacturing reference point on the origin of the manufacturing reference coordinate system and another manufacturing reference point as the two reference points; as shown at step 720, establishing the coordinate transforming matrix for the theoretical object contour partial coordinate system (ic, jc) and the object contour partial coordinate system (ic', jc'). The matrix mentioned above can be indicated as:

$$\begin{bmatrix} j_c \\ i_c \end{bmatrix} = \begin{bmatrix} t_j \\ t_i \end{bmatrix} \begin{bmatrix} \cos\theta & -\sin\theta \\ \sin\theta & \cos\theta \end{bmatrix} \begin{bmatrix} j_{c'} \\ i_{c'} \end{bmatrix}, \quad (1)$$

and $t_i$, $t_j$: the moving distances on a plane toward the I and j directions in the two coordinate systems;

$\theta$ the rotation angles in the two coordinate systems.

Next, as shown at step 722, the positions and orientations of the actual object contour coordinate system in the pixel coordinate system can be obtained after the image is retrieved. Therefore, as shown at step 730, the coordinate transforming formula of the actual-object-contour partial coordinate system and the theoretical object contour coordinate system can be obtained through the derivation of the transforming matrix.

(3) as shown at 740, employing the coordinate transforming formula to rotate and move the image of the actual object contour, and employing the contour measurement method to analyze the new actual object contour again; and because the positions of the actual object contour maybe fall outside the image netting grid after the coordinate transformation works on the actual object contour, as shown at step 750, employing the object image to perform the coordinate transformation and employing the contour measurement to define the actual object contour again.

At last, as shown at step 760, the actual object contour after contour measured is overlapped in the coordinate system of the theoretical object contour, i.e. the reference coordinate system.

Error Identifying Method

Figure 8:
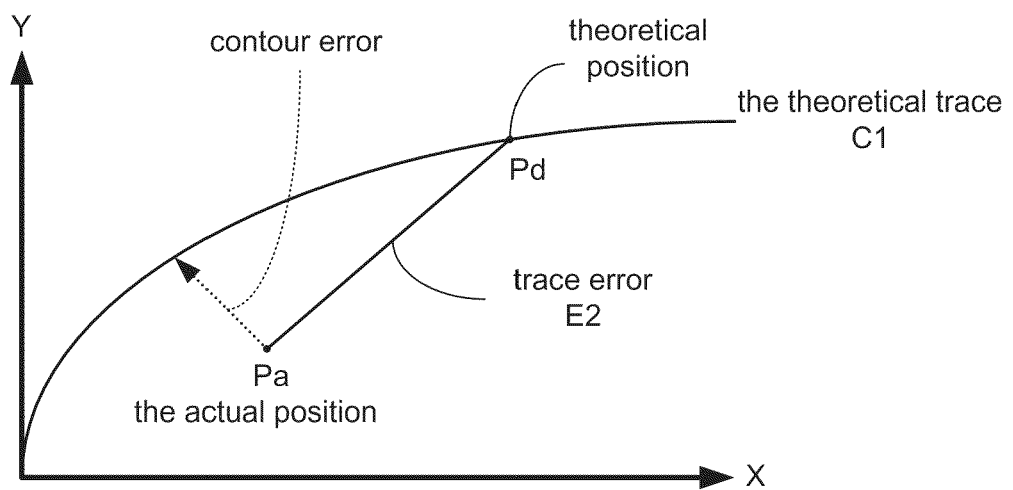
FIG. 8 is the diagram of the definition of the trace error and the contour error in the space.

The manufacturing errors can be classified as two types: (1) contour error and (2) trace error or following error, as shown in FIG. 8. The contour error E1 is caused by the mismatch of the multi-axis serving to induce the cutting trace deviates from the predetermined theoretical trace when moving. The definition of the trace error is the shortest distance between the actual position $P_a$ and the theoretical trace, $\epsilon$. And the trace error E2 refers to the distance between the actual position $P_a$ and the theoretical position $P_d$ of the cutting tool with respect to the movement in each of the directions.

Figure 9:
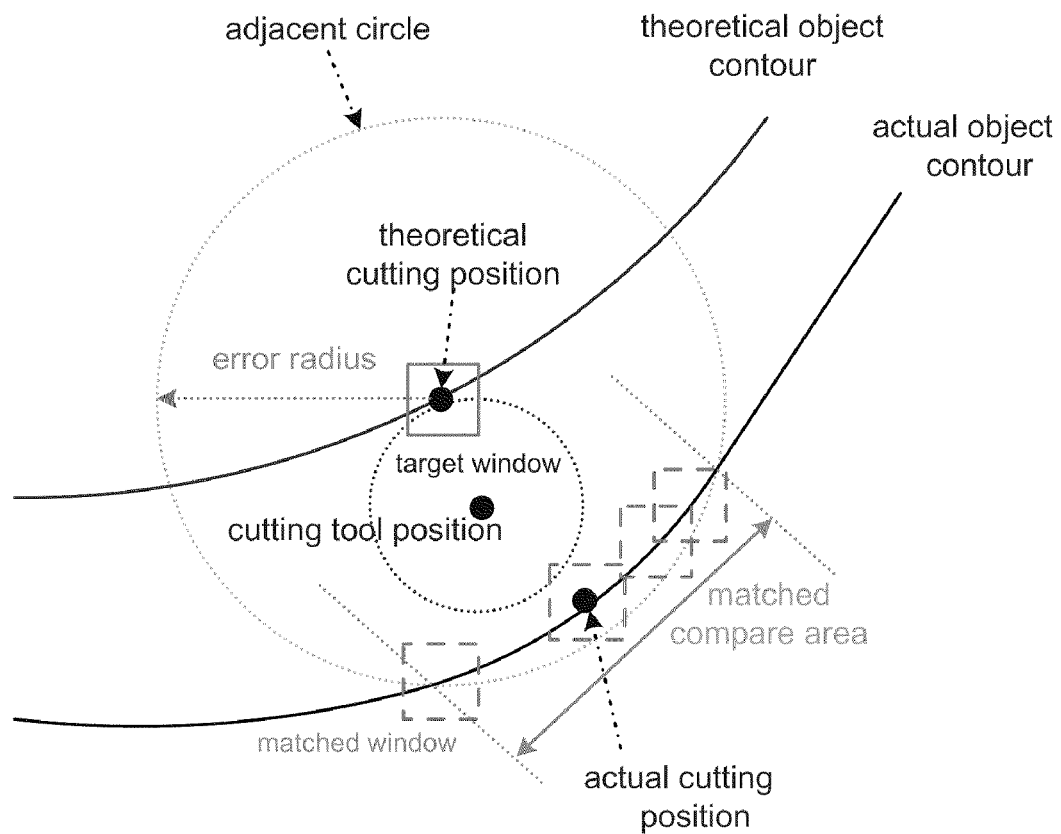
FIG. 9 is the diagram of the partial contour of the microcosmic concept.

It is necessary to know the actual positions when calculating the contour error and trace error. It can measure the actual manufacturing error by adopting directly measuring the object after the object is manufactured. But the drawback is that the actual position of the cutting tool in the manufacturing process cannot be obtained by the actual object contour. According to the definitions of the two errors, the theoretical cutting tool trace, the instant manufacturing position ($P_a$) of the cutting tool in practice, and the corresponding theoretical position ($P_d$) of the cutting tool have to be know, and then the contour error and the trace error can be calculated. Therefore, an error identifying method is established in one embodiment of the present invention to deal with the problem mentioned above. In the error identifying methods, the most important part is how to the manufacturing position of the cutting tool in contour matching method. In one embodiment of the present invention, the sliding searching micron matching window is employed to compare the similarity of the actual-object partial contour and theoretical partial contour to decide the manufacturing position of the actual cutting tool of the corresponding theoretical cutting position. The contour comparison method is employed to determine actual cutting points and calculate the errors according the following presumptions: because the micro-device machine tool is very precious that partial pratical and theoretic object are analyzed by the microcosmic concept, as shown in FIG. 9. There are two presumptions according the distribution of the contour: (1) The contour shape near contour of the theoretic cutting is the contour near the actual cutting point very much. (2) On the cutting trace of the cutting tool, cutting point of the cutting tool locates within the error radius of the cutting point of the theoretic cutting tool.

Feature matching theory of the image can be employed to obtain coordinate of the matching point, when each of the coordinate of the theoretical is obtained according to the two presumptions above, it has to perform definition in accordance with the searching condition and searching target before proceeding with image matching: (1) The theoretical cutting point is defined by cutting trace of the cutting tool and the theoretical contour. The theoretical contour points are defined as the theoretical cutting is defined when there the shortest distance between the cutting tool trace and the theoretic contour. (2) The coordinate of the theoretic cutting point and theoretical contour is defined as that the theoretical contour target is defined as the feature point. (3) The actual object contour coordinate is B, and actual object contour coordinate is defined as the feature of the image B. (4) Each of the theoretical cutting is set as the cutting window's center. (5) The manufacturing precision of the machine tool defines the adjacent radius of a circle, and the adjacent circle is transformed into the pixel unit according to resolution of the image to work as the searching size of the searching window for the feature matching theory of the image. (6) improvement similarity measurement feature matching is established to provide the similarity parameter formula of Candocia to work for cutting contour matching similarity calculation.

Figure 10:
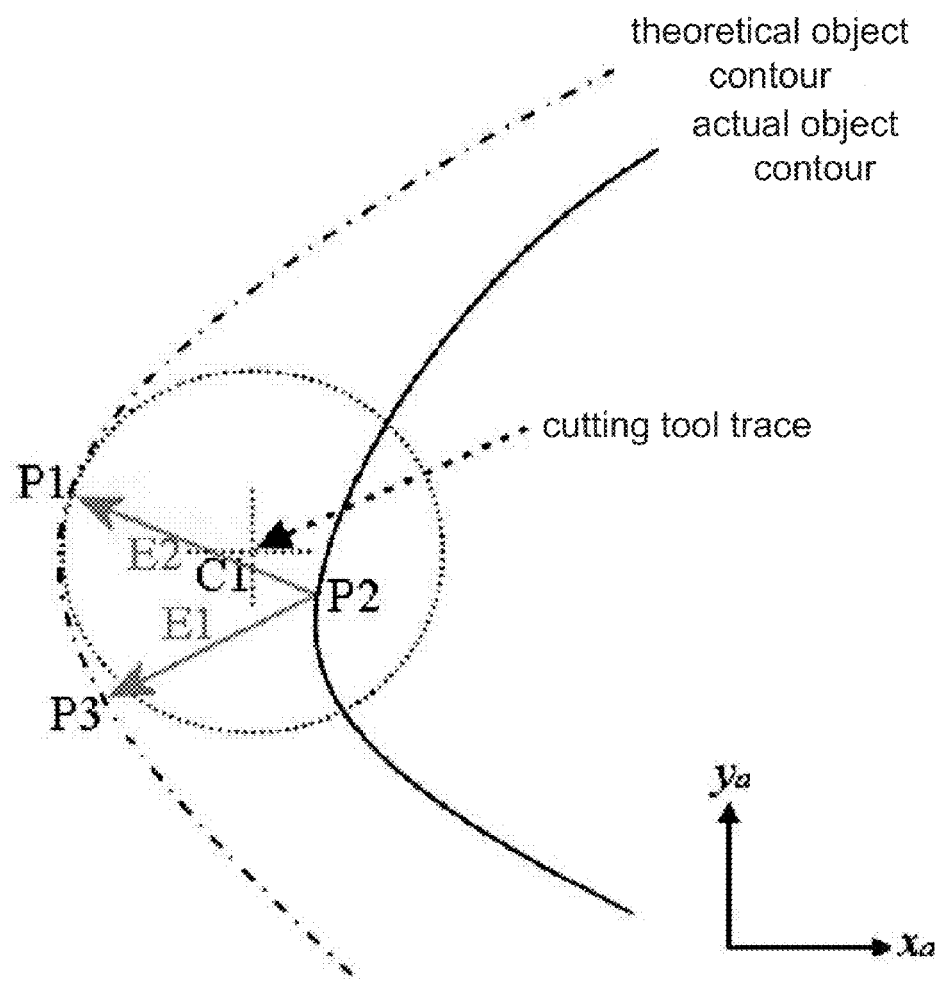
FIG. 10 is the diagram of the error model.

After each of the theoretical cutting points all have searched the best corresponding the real cutting point, the manufacturing contour error and trace error are analyzed according to the definition of the contour error and trace error in the space. Referring to FIG. 10, P1 is the theoretical cutting point when cutting tool cuts the trace C1, and P2 is the actual cutting point. According to the theory of the contour error, the distance between P2 and P3 is the contour error E1 of the object when the cutting tool cuts the trace C1. According to the theory of the trace error, the distance between P1 and P2 is the contour error E2 of the object when the cutting tool cuts the trace C1.

Feature Matching Theory of the Image

Figure 11:
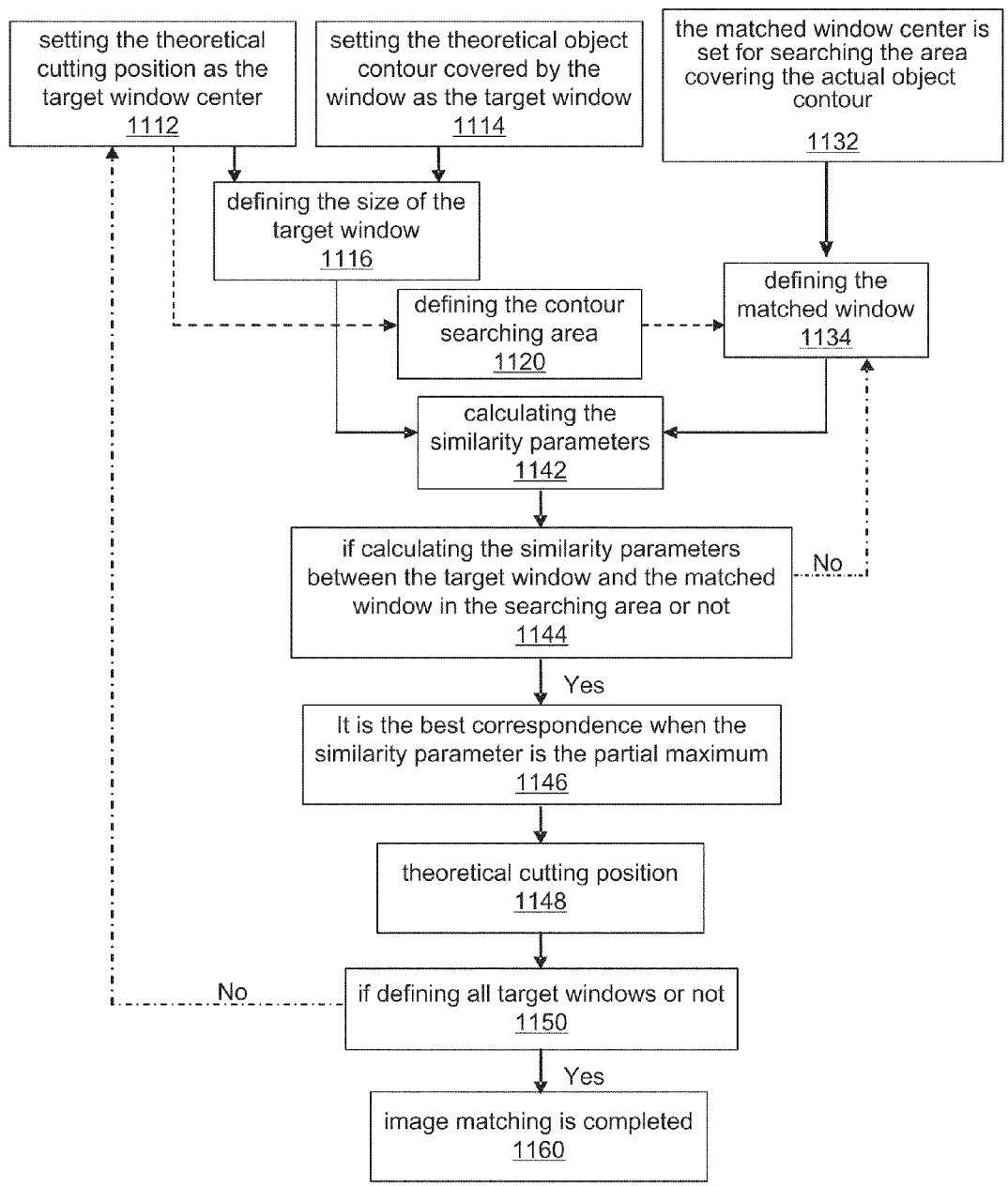
FIG. 11 is the diagram of the image matching flowchart.

Image matching is to search the corresponding relation of the object points in the image space. The definition of the corresponding relation is as the following: the corresponding points in the corresponding image plane can be searched certainly for the object points in the image space. Referring to FIG. 11, it is the flowchart of the feature matching theory of the image, comprising the steps as the following:

1. As shown at step 1112, 1114, and 1116, the theoretical cutting position is set as the target window center. And the theoretical object contour covered by the window is set as the target window (as shown in FIG. 9, the small window surrendered by the line). The size of the target window is defined as well. Usually, the size of the target window is 7×7 or 11×11 (pixel).

2. As shown at step 1120, the theoretical cutting trace is set as the center of the circle to accomplish an adjacent circle with the error radius. The covered area is the contour searching area (as shown in FIG. 9, the big circle surrounded by the dotted line).

3. As shown at step 1132 and 1134, the matched window center is set for searching the area covering the actual object contour from the top to the bottom and from the left to the right, beginning from the top of the searching area and with an increment by a pixel. And also the actual object contour covered by the window is set as the matched window (the defined size is the same as the target window, as shown in FIG. 9, the small window surrounded by the line).

4. As shown at step 1142, 1144, 1146, and 1148, the similarity parameters between the target window and the matched window are calculated. In the research, the similarity parameter formula of the improved Candocia [60] is employed to work on the calculation of the similarity parameters between the two windows. Step 3 and 4 are repeated. It is the best correspondence of the target window at step 1 (theoretical cutting position), i.e. the actual cutting position, when the similarity parameter is the partial maximum after the searching of the matched window in the searching range is done.

5. As shown at 1150 and 1160, step 1, 2, 3, and 4 are repeated until all of the best corresponding coordinates are searched for all of the theoretical cutting positions.

Similarity Parameter Formula of the Similarity Measurement

The calculation formula of Candocia similarity measurement parameter does not include the calculation of the pixel gradient. It is easy to cause misjudgment. Therefore, in an embodiment of the present invention, the coordinate slope for the feature point in the window and the center of the window is employed to perform the calculation of the similarity parameter. In the meantime, to avoid identifying the practical actual cutting points, the slope relation formula for calculating the center of the window and the coordinated between the previous cutting points is added to increase the reliability of the similarity identification. The modified similarity parameter calculating formula is as the following:

$$\Psi(A \to B) = \left\{ \sum_{q=1}^{h} \frac{P}{(D_q+1)} \left(1 - \frac{|S_A - S_B|_q}{1-(-1)}\right) \right\} \left(1 - \frac{|S_C - S_D|}{1-(-1)}\right),$$

and $\Psi(A \to B)$ is a similarity parameter;

$N_A$, $N_B$ are a quantity of the theoretical cutting points and a quantity of the real cutting points in the theoretical window and in the theoretical window respectively;

$P=1/h$ is a matching weight;

h is $N_A$ if $N_A$ smaller than $N_B$ or is $N_B$ if $N_B$ smaller than $N_A$;

$D_q$ is a distance closest real cutting point from $q_{th}$ theoretical cutting point to matched window in the theoretical window;

$S_A$ is a slope in the coordinate system between the $q_{th}$ theoretical cutting point to a center of the theoretical window in the in the theoretical window;

$S_B$ is a slope in the coordinate system between nearest real cutting point and a center of the matched window in the matched window;

$S_C$ is a slope in the coordinate system between the center of the theoretical window and a previous theoretical cutting point of the $q_{th}$ theoretical cutting point; and $S_D$ is a slope in the coordinate system between the center of the matched window and a previous real cutting point.

Figure 12:
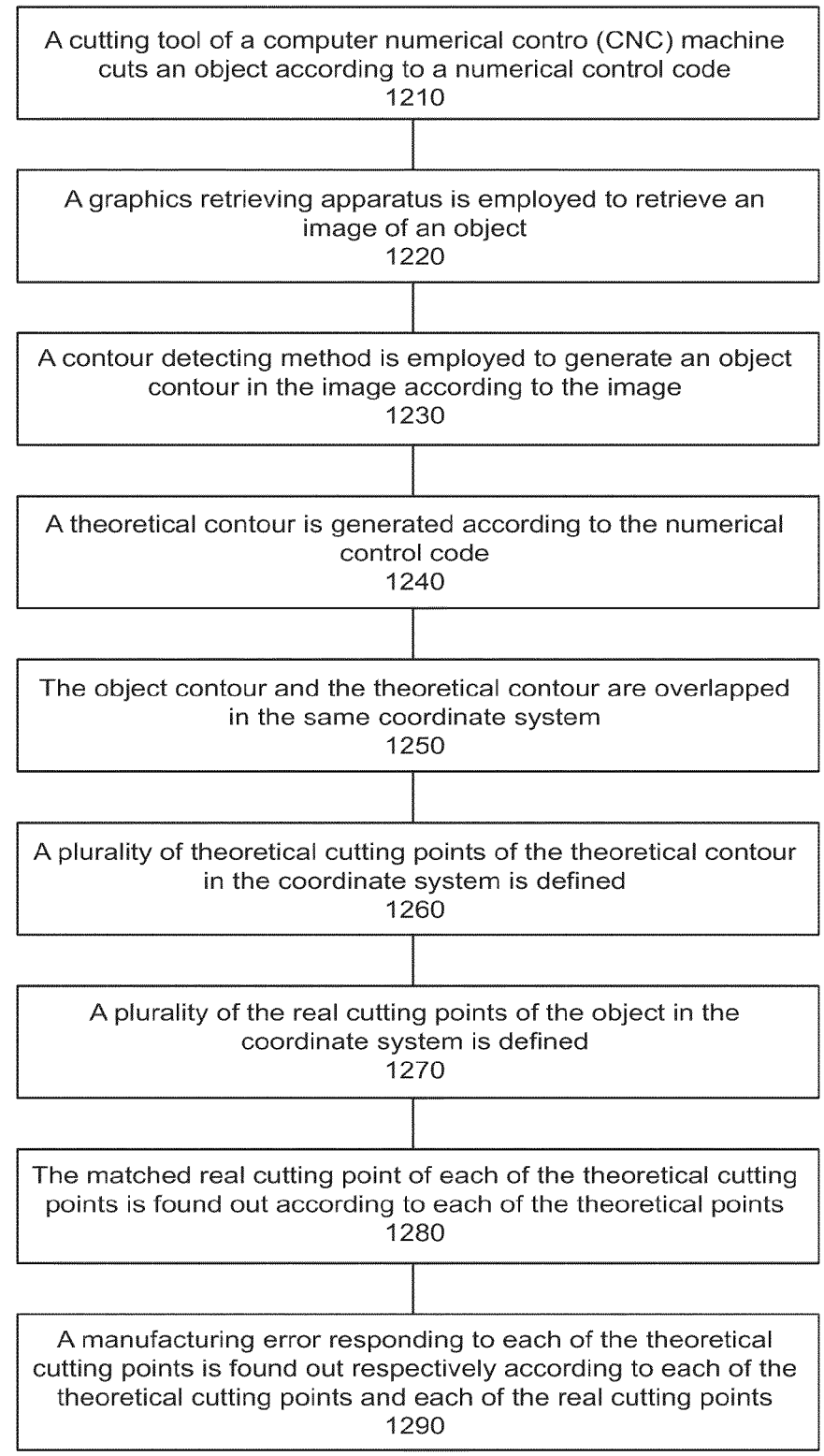
FIG. 12 is a flowchart for determining manufacturing error.

Accordingly, an embodiment of the present invention is a method for on-machine 2-D contour measurement, as shown in FIG. 12. At first as shown at step 1210, a cutting tool of a CNC machine tool cuts an object according to the numerical control code. First, as shown at step 1210, a cutting tool of a computer numerical control (CNC) machine cuts an object according to a numerical control code. The next is illustrated as step 1220 and step 1230, a graphics retrieving apparatus is employed to retrieve an image of an object, and a contour detecting method is employed to generate an object contour in the image according to the image. Besides, as shown at step 1240, a theoretical contour is generated according to the numerical control code. Next, as shown at step 1250, the object contour and the theoretical contour are overlapped in the same coordinate system. And then as shown at steps 1260 and 1270, a plurality of theoretical cutting points of the theoretical contour in the coordinate system is defined, and also a plurality of the real cutting points of the object in the coordinate system is defined. A person skilled in the art can define the variant netting grid according to the different coordinate systems, and a plurality of the theoretical cutting and real cutting points locate in the grid of the netting grid. For example, the netting grid may be a pixel netting grid. Each of the theoretical cutting points and each of the real cutting points respectively correspond to a pixel of the pixel netting grid.

Next, as shown at step 1280, the matched real cutting point of each of the theoretical cutting points is found according to each of the theoretical points. The matched real cutting points of the theoretical cutting points are found out in an error range of the corresponding theoretical cutting points. In an embodiment of the present invention, it further comprises a defined error radius according to the precision of the CNC machine tool. Its error range is a circle whose center of the circle is the theoretical cutting points with the error radius as the radius of the circle.

Therefore, the method for respectively determining the matched real cutting point of each of the theoretical cutting according to each of the theoretical cutting points comprises: defining the matched window of each of the corresponding real cutting points respectively according to each of the real cutting points in the error range; determining the matched real cutting points of the theoretical cuttings by matching the theoretical window and each of the matched windows. In one embodiment of the present invention, matching the theoretical window and each of the matched windows is the similarity measurement of the Candocia 3-D feature matching.

As mentioned above, matching the theoretical window with each of the matching windows is to calculate a similarity parameter between the theoretical window and each of the matching windows, wherein a similarity parameter between the theoretical window and matching window corresponding to the matched real cutting point of the theoretical cutting point is the smallest, and, $$\Psi(A \to B) = \left\{ \sum_{q=1}^{h} \frac{P}{(D_q+1)} \left(1 - \frac{|S_A - S_B|_q}{1-(-1)}\right) \right\} \left(1 - \frac{|S_C - S_D|}{1-(-1)}\right)$$

$\Psi(A \to B)$ is a similarity parameter;

$N_A$, $N_B$ are a quantity of the theoretical cutting points and a quantity of the real cutting points in the theoretical window and in the theoretical window respectively;

P=1/h is a matching weight;

h is $N_A$ if $N_A$ smaller than $N_B$ or is $N_B$ if $N_B$ smaller than $N_A$;

$D_q$ is a distance closest real cutting point from $q_{th}$ theoretical cutting point to matched window in the theoretical window;

$S_A$ is a slope in the coordinate system between the $q_{th}$ theoretical cutting point to a center of the theoretical window in the in the theoretical window;

$S_B$ is a slope in the coordinate system between nearest real cutting point and a center of the matched window in the matched window;

$S_C$ is a slope in the coordinate system between the center of the theoretical window and a previous theoretical cutting point of the $q_{th}$ theoretical cutting point; and $S_D$ is a slope in the coordinate system between the center of the matched window and a previous real cutting point.

At last, as shown at step 1290, a manufacturing error responding to each of the theoretical cutting points is determined respectively according to each of the theoretical cutting points and each of the real cutting points. And the manufacturing error comprises a contour error and trace error. The contour error is a the nearest distance between matched real cutting point of the theoretical cutting point and the theoretical contour, and the trace error is a distance between the matched real cutting point of the theoretical cutting and the theoretical cutting point.

In one embodiment of the present invention, it further comprises a cutting tool trace generated according to the numerical control code, a position of the cutting tool of the cutting of the cutting tool according to the theoretical cutting point, and a manufactured error of the corresponding cutting tool of the manufacturing error of the theoretical cutting point.

Accordingly, another embodiment of the present invention is a 2-D contour measurement system, including an object, a computer numerical control (CNC) machine tool storing a numerical control code, and an error identifying apparatus. The CNC machine tool cuts the object by a cutting tool according to the numerical control code. Besides, the error identifying apparatus may be a computer storing programming code, so that the computer can be programmed to work as the following apparatus, which includes an apparatus employing a graphics retrieving apparatus to retrieve an image of the object, an apparatus employing a contour detecting method to generate a contour of the image according to the image, an apparatus generating a theoretical contour according to the numerical control code, an apparatus overlapping the object contour with the theoretical contour in a coordinate system, an apparatus defining a plurality of theoretical cutting points of the theoretical contour in the coordinate system, an apparatus defining a plurality of real cutting points of the object contour in the coordinate system, an apparatus determining out a matched real cutting point of each of the real cutting points respectively according to each of the real cutting points, an apparatus identifying a manufactured error corresponding to each of the theoretical cutting points respectively according to each of the theoretical cutting points and the matched real cutting point. The other detail of the embodiment has been disclosed in the description above. There is no need to repeat again.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the inventions as determined by the appended claims when interpreted in accordance with the breath to which they are fairly and legally entitled.

It is understood that several modifications, changes, and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method for on-machine 2-dimensional (2-D) contour measurement, comprising:

cutting an object by a cutting tool of a computer numerical control (CNC) machine tool according to a numerical control code;

retrieving an image of the object by an image retrieving apparatus;

generating an object contour according to the image according in a contour detecting method;

generating a theoretical contour according to the numerical control code;

superimposedly placing the object contour and the theoretical contour in a coordinate defining a plurality of theoretical cutting points of the theoretical contour in a coordinate system;

defining a plurality of real cutting points of the object contour in the coordinate;

obtaining each of matching real cutting points according to each of the theoretical cutting points; and identifying each manufacturing error of each of the theoretical cutting points according to each of the theoretical cutting points and each of the matching real cutting points.

2. The method for on-machine 2-D contour measurement according to claim 1, wherein the matching real cutting point of a theoretical cutting point is within a range of an error of the theoretical cutting point.

3. The method for on-machine 2-D contour measurement according to claim 2, further comprising defining an error radius according to a precision of the CNC machine tool, wherein the range of the error forms a circle, a center of the circle is the theoretical cutting point, and a radius of the circle is the error radius.

4. The method for on-machine 2-D contour measurement according to claim 2, further comprising:

defining a corresponding theoretical window according to a theoretical cutting point;

respectively defining a matching window corresponding to each of the real cutting points according to each of the real cutting points within the range of the error, and matching a theoretical window with each of the matching windows to obtain a matched real cutting point of the theoretical cutting point.

5. The method for on-machine 2-D contour measurement according to claim 4, wherein matching the theoretical window with each of the matching windows is to calculate a similarity parameter between the theoretical window and each of the matching windows, and minimizing a similarity parameter between the theoretical window and matching window corresponding to the matched real cutting point of the theoretical cutting point.

6. The method for on-machine 2-D contour measurement according to claim 5, wherein $$\Psi(A \to B) = \left\{ \sum_{q=1}^{h} \frac{P}{(D_q+1)} \left(1 - \frac{|S_A - S_B|_q}{1-(-1)}\right) \right\} \left(1 - \frac{|S_C - S_D|}{1-(-1)}\right),$$

Wherein $\Psi(A \to B)$ is a similarity parameter;

$N_A$, $N_B$ are a quantity of the theoretical cutting points and a quantity of the real cutting points in the theoretical window and in the theoretical window respectively;

$P=1/h$ is a matching weight;

h is $N_A$ if $N_A$ smaller than $N_B$ or is $N_B$ if $N_B$ smaller than $N_A$;

$D_q$ is a distance closest real cutting point from $q_{th}$ theoretical cutting point to matched window in the theoretical window;

$S_A$ is a slope in the coordinate system between the $q_{th}$ theoretical cutting point to a center of the theoretical window in the in the theoretical window;

$S_B$ is a slope in the coordinate system between nearest real cutting point and a center of the matched window in the matched window;

$S_C$ is a slope in the coordinate system between the center of the theoretical window and a previous theoretical cutting point of the qth theoretical cutting point; and $S_D$ is a slope in the coordinate system between the center of the matched window and a previous real cutting point.

7. The method for on-machine 2-D contour measurement according to claim 1, wherein the manufacturing error comprises a contour error, the contour error is a nearest distance between matched real cutting point of the theoretical cutting point and the theoretical contour, the manufactured error comprises trace error, and the trace error is a distance between the matched real cutting point of the theoretical cutting and the theoretical cutting point.

8. The method for on-machine 2-D contour measurement according to claim 1, wherein a unit of the coordinate system is a pixel.

9. The method for on-machine 2-D contour measurement according to claim 1, further comprising generating a cutting path of the cutting tool according to the numerical control code, a position of the cutting tool, and a manufactured error.

10. A system for on-machine 2-D contour measurement, comprising:
an object;
a computer numerical control (CNC) tool storing a numerical control code, wherein the CNC shapes an object by a cutting tool according to a numerical control code;
an error identifying apparatus, comprising:
an apparatus employing a graphics retrieving apparatus to retrieve an image of the object;
an apparatus employing a contour detecting method to generate an object contour of the image according to the image;
an apparatus generating a theoretical contour according to the numerical control code;
an apparatus overlapping the object contour with the theoretical contour in a coordinate system;
an apparatus defining a plurality of theoretical cutting points of the theoretical contour in the coordinate system;
an apparatus defining a plurality of real cutting points of the object contour in the coordinate system;
an apparatus determining a matched real cutting point for each of the theoretical cutting points respectively;
an apparatus identifying a manufacturing error corresponding to each of the theoretical cutting points and the matched real cutting point.

11. The system for on-machine 2-D contour measurement according to claim 10, wherein a matched real cutting point of a theoretical cutting point is within a range of an error corresponding to the theoretical cutting point.

12. The system for on-machine 2-D contour measurement according to claim 11, further comprising defining an error radius according to a precision of the CNC machine tool, wherein the range of the error forms a circle, a center of the circle is the theoretical cutting point, and a radius of the circle is the error radius.

13. The system for on-machine 2-D contour measurement according to claim 11, further comprising:
defining a corresponding theoretical window according to the theoretical cutting point;
respectively defining a matching window corresponding to each of the real cutting points according to each of the real cutting points within the range of the error, and
matching a theoretical window with each of the matching windows to obtain a matched real cutting point of the theoretical cutting point.

14. The system for on-machine 2-D contour measurement according to claim 13, wherein matching the theoretical window with each of the matching windows is to calculate a similarity parameter between the theoretical window and each of the matching window, and minimizing a similarity parameter between the theoretical window and matching window corresponding to the matched real cutting point of the theoretical cutting point.

15. The system for on-machine 2-D contour measurement according to claim 14, wherein $$\Psi(A \to B) = \left\{ \sum_{q=1}^{h} \frac{P}{(D_q+1)} \left(1 - \frac{|S_A - S_B|_q}{1-(-1)}\right) \right\} \left(1 - \frac{|S_C - S_D|}{1-(-1)}\right),$$

wherein $\Psi(A \to B)$ is a similarity parameter;

$N_A$, $N_B$ are a quantity of the theoretical cutting points and a quantity of the real cutting points in the theoretical window and in the theoretical window respectively;

$P=1/h$ is a matching weight;

h is $N_A$ if $N_A$ smaller than $N_B$ or is $N_B$ if $N_B$ smaller than $N_A$;

$D_q$ is a distance closest real cutting point from $q_{th}$ theoretical cutting point to matched window in the theoretical window;

$S_A$ is a slope in the coordinate system between the $q_{th}$ theoretical cutting point to a center of the theoretical window in the in the theoretical window;

$S_B$ is a slope in the coordinate system between nearest real cutting point and a center of the matched window in the matched window;

$S_C$ is a slope in the coordinate system between the center of the theoretical window and a previous theoretical cutting point of the $q_{th}$ theoretical cutting point; and $S_D$ is a slope in the coordinate system between the center of the matched window and a previous real cutting point.

16. The system for on-machine 2-D contour measurement according to claim 10, wherein the manufacturing error comprises a contour error, the contour error is a nearest distance between matched real cutting point of the theoretical cutting point and the theoretical contour, the manufactured error comprises trace error, and the trace error is a distance between the matched real cutting point of the theoretical cutting and the theoretical cutting point.

17. The system for on-machine 2-D contour measurement according to claim 10, wherein a unit of the coordinate system is a pixel.

18. The system for on-machine 2-D contour measurement according to claim 10, further comprising generating a cutting path of the cutting tool according to the numerical control code, a position of the cutting tool, and a manufactured error.

* * * * *